Patented July 19, 1938

2,124,307

UNITED STATES PATENT OFFICE 2,124,307

METHOD OF DETERMINING THE AMOUNT OF SULPHUR IN MIXTURES CONTAINING THE SAME

Robert G. Mewborne, Albuquerque, N. Mex., and John F. Les Veaux, Middleport, N. Y., assignors to Niagara Sprayer and Chemical Co., Inc., Middleport, N. Y., a corporation No Drawing. Application June 18, 1937, Serial No. 148,950

10 Claims. (Cl. 23—230)

This invention relates to the estimation or determination of the amount of elementary sulphur in mixtures containing the same and more particularly to the amount of elementary sulphur in aqueous media containing the sulphur in the form of finely divided particles in suspension therein and adapted for external application to animals particularly sheep, goats and cattle, for controlling insect pests to which such animals are normally subject.

In recent years dips or swims composed essentially of finely divided elementary sulphur dispersed or suspended in water by means of so-called wetting agents or dispersing agents have come into use for the purposes indicated above and particularly for the control or eradication of scabies, ticks and lice on sheep and one of the preferred dips or swims employed for this purpose consists of the special form of extremely finely divided, or colloidal sulphur, commonly known in the art as bentonite sulphur, dispersed in water. Bentonite sulphur is a granular or powdered product normally consisting of about 30% to 35% of finely divided or colloidal sulphur and a special clay-like mineral known as bentonite and is usually made by mixing ordinary ground sulphur with powdered or granular bentonite and then heating this mixture above the melting point of the sulphur to absorb the molten sulphur in the bentonite and then cooling the mixture to solidify the molten sulphur in situ in the powdered or granular bentonite. The method of manufacture and properties of bentonite sulphur are described in detail in the Journal of Industrial and Engineering Chemistry, vol. 126, page 340 (March 1934). A relatively coarse or granular form of bentonite sulphur sold under the trade name of Kolodip is particularly well suited for preparing sheep dips or swims because of the ease with which the dry granular product may be dispersed in water to form the dip by merely sifting the granular bentonite sulphur or Kolodip over the surface of the water in a thin layer to permit it to become wetted by the water and subsequently stirring, to distribute or disperse the bentonite sulphur or Kolodip throughout the dip or bath. In the initial preparation, the wetting of the bentonite sulphur on the surface of the water before stirring usually requires about 10 minutes. In recharging the bath after it has been used for a few dippings it is unnecessary to wait 10 minutes when fresh portions of bentonite sulphur are added, but the bath should be thoroughly stirred while sifting in such added quantities of bentonite sulphur. The dispersion of the bentonite sulphur or Kolodip in the bath is in the form of such finely divided particles of the bentonite sulphur, which are gelatinous in character when wet, that the dip acquires a milky appearance very much resembling ordinary milk. Such suspensions of bentonite sulphur are sufficiently stable to form a bath or dip of substantially uniform composition, normally requiring no further stirring to maintain this uniformity during practical use except that produced by the animals as they are dipped into the bath or swim through the bath. However, the bath may be stirred in any other convenient manner, if desired.

In using animal dips in actual practice it is, of course, highly desirable that the active or toxic agent or ingredient of the bath, regardless of the nature of the toxic agent employed, be maintained at all times within a certain optimum range of concentration and for this purpose it is equally desirable or necessary that a very simple and convenient analytical test be available for estimating or determining the concentration of the toxic ingredient in the bath so that as it is removed by adhering to the bodies of the animals or becomes depleted by dilution or by decomposition or from any other causes, a suitable predetermined quantity of the active ingredient may be added to the bath to supply such deficiency. The desirability or necessity of a suitable analytical field test is emphasized by the fact that the United States Bureau of Animal Industry of the United States Department of Agriculture requires in all official dips the use of a portable testing outfit for determining the strength of the bath or vat, at the vat side, or at the place where such official dips are made. It is obvious from this requirement that a suitable analytical field test must be adapted to be carried out by operators who are not highly skilled in chemical manipulation, with very simple apparatus and by a simple and convenient procedure or manipulation and with chemical reagents which are adapted to these ends. So far as applicants are aware, the various analytical methods hitherto known or in common use for determining elementary sulphur have been based upon the oxidation of elementary sulphur to sulphuric acid or alkali metal sulphates in acid or alkaline solution respectively, and the subsequent determination of these oxidation products thus formed by well known procedures, but such methods obviously are not satisfactory for use as a vat side or field test for determining elementary sulphur in animal dips or swims for various reasons including the high degree of skill required, the time necessary for completing the determination, the dangerous nature of the reagents used and the complicated and cumbersome character of the apparatus which is necessary for carrying out the determination.

The method of the present invention, on the other hand, fulfills all of the above mentioned requirements of a vat side or field test to a highly satisfactory degree as is illustrated by the fact that the chemical reagents required may be safely and conveniently transported in a portable testing outfit of substantially the same type, dimensions and weight as is now in current use in making official dips with lime sulphur solution in accordance with the requirements of the United States Bureau of Animal Industry of the United States Department of Agriculture as mentioned above. Furthermore, the manipulation or procedure involved in carrying out the test in accordance with the method of the present invention is very similar to that employed in testing lime sulphur solutions in connection with the official dips with lime sulphur solution just referred to, the principal differences in the manipulation or procedure consisting merely in the heating or boiling of the sample of the dip or bath for a short period of time at one stage of the procedure and in the control of the temperature during titration.

While the method of the present invention is adapted for the determination or estimation of the amount of finely divided suspended elementary sulphur, or so-called wettable sulphurs generally, in aqueous media containing the same, and so far as applicants are aware, also for the estimation of elementary sulphur in any form in any mixtures in which it may occur, it is particularly suitable and convenient for determining the amount of suspended finely divided or colloidal elementary sulphur in sheep swims or dips as initially made from bentonite-sulphur and water as described above and also after use as an animal dip.

The method of the present invention is based upon the conversion of the elementary sulphur to an alkali metal sulphide and the titration of this reaction product with standardized iodine solution, using a soluble salt of nitroprussic acid as the indicator for the end point of the titration.

In carrying out the method of our invention we prefer to proceed in accordance with Example I, below, which is given by way of illustrating the preferred method of procedure and for this reason the preferred method is described in connection with the determination of the amount of suspended elementary sulphur in a bath or swim consisting essentially of bentonite-sulphur dispersed in water, such baths usually containing initially from about ½% to about 2% of suspended sulphur, corresponding to from about 1½% to 6% of suspended bentonite sulphur in the form of a milky suspension in water as described above.

EXAMPLE I

*Reagents and containers therefor*

1. *Sodium hydroxide.*—5 grams of granular commercial sodium hydroxide contained in stoppered bottle of suitable size.

2. *Standard iodine solution.*—To make a stock solution, dissolve 79 grams of iodine crystals and 158 grams of potassium iodide in a small amount of water and dilute with water to a total volume of one liter. A suitable portion of this stock solution is placed in a small stoppered dropping bottle of about 150 c. c. capacity for use at the vat side.

3. *Sodium nitroprusside indicator solution.*—Dissolve 0.0375 gram (in the form of a tablet) in 15 c. c. of water and place the solution in a suitable dropping bottle.

*Utensils and equipment*

(a) An Erlenmeyer flask of about 400 c. c. capacity.

(b) A measuring cylinder, graduated or marked in units of 1 c. c. the zero mark being near the top and the 25 c. c. mark being at the bottom of the cylinder.

(c) A suitable source of heat, such as an alcohol lamp or a bed of hot coals for heating or boiling the sample of the bath to be tested after adding the sodium hydroxide thereto.

(d) A suitable thermometer.

*Procedure in making the test*

While the sheep are in the bath, keeping it agitated, a 25 c. c. sample is taken by emersing the 25 c. c. measuring cylinder bottom side up below the surface of the bath, keeping the top or open end of the cylinder closed with the hand, to a depth such that the open end of the cylinder is about 6 inches below the surface of the bath, then removing the hand, righting the cylinder and allowing it to fill with the liquid of the bath. Quickly pour out the excess liquid until the surface of the liquid in the graduate is opposite the zero mark on the cylinder. The measuring cylinder will then contain a 25 c. c. sample of the bath to be tested. Pour the 25 c. c. sample of the bath into the 400 c. c. Erlenmeyer flask, which, of course, should be cleaned before introducing the sample. Without cleaning or rinsing the graduate, measure out by means of the graduate 40 c. c. of water and empty into the Erlenmeyer flask containing the sample. Now add the 5 grams of sodium hydroxide contained in the stoppered bottle numbered (1) to the contents of the Erlenmeyer flask. Now heat the contents of the Erlenmeyer flask by means of the alcohol lamp or the bed of hot coals until the liquid reaches a temperature of between about 194° F. and 217° F. and continue the heating for about 6 minutes. Then discontinue the heating and add about 100 c. c. of cold water to the contents of the flask and permit the contents to cool further if necessary until the temperature is between about 70° F. to about 80° F. Wash the graduated cylinder thoroughly and dry and then fill it to the zero mark with the standard iodine solution. (Note: each 2 c. c. of the standard iodine solution is equivalent to .1% of elementary sulphur.) While gently swirling the liquid in the Erlenmeyer flask pour in slowly the standard iodine solution from the graduated cylinder until the yellow color due to the sodium monosulphide solution becomes faint in intensity or almost disappears. Then let the contents of the Erlenmeyer flask come to rest and gently drop on the surface of the liquid one drop of the sodium nitroprusside indicator solution from the dropping bottle, observing carefully any color change which occurs after the drop of indicator mixes with the contents of the flask—just at the point where the drop falls on the liquid in the flask. If a violet color appears at the point where the drop mixes with the liquid add a little more of the standard iodine solution from the graduated cylinder. Mix the contents of the Erlenmeyer flask by swirling as before and test again with a drop of the standard iodine solution. Continue the alternate addition of the standard iodine solution and the addition of the drop of sodium nitroprusside solution until a drop of the indicator solution just fails to produce any violet color, carefully avoiding the addition of any excess of the testing fluid, and noting carefully the total amount of the standard iodine solution which has been added to the contents of the Erlenmeyer flask during this procedure. The percent by weight of suspended elementary sulphur contained in the 25 c. c. sample of the bath tested in this manner may now be calculated from the number of cubic centimeters of the standard iodine solution employed by multiplying the number of cubic centimeters of standard iodine solution thus consumed by 0.05. It will be observed that this multiplication factor (0.05) corresponds to a ratio of iodine to sulphur which is approximately 20% lower than that indicated by the following equation: $Na_2S + I_2 = 2NaI + S$.

We have applied the method of the above example to a variety of different aqueous suspensions containing known amounts of finely divided elementary sulphur and have found that the method gives satisfactorily accurate results, and we have also found this to be true in instances where the aqueous suspension contains, in addition to the suspended elementary sulphur, various compounds of sulphur such as sulphates and organic sulphur compounds such as are present in used sheep dips and which compounds of sulphur arise from impurities in the water or from impurities introduced into the water by the sheep or other animals previously treated with the bath. Thus, it will be seen that the method of the present invention possesses important advantages over the older analytical methods previously referred to which frequently give erroneous results when used for the purpose of determining elementary sulphur, these erroneous results being usually too high because these older methods include or comprise determination of sulphates and the organic sulphur compounds referred to, as well as other compounds of sulphur, none of which latter compounds are the active toxic agents sought to be determined by the present method.

It will be understood, of course, to those skilled in the art that applicants' invention is not limited to the specific proportions or reagents employed or to the exact composition of the bath tested or to the conditions under which the test is carried out, such as the temperature to which the mixture of the sample and sodium hydroxide is heated or the time of such heating, nor is the invention limited to the various other details set forth in the above example, but various changes may be made therein without departing from the true scope of the invention. Thus, for instance, we have found that instead of the 5 grams of sodium hydroxide we may employ as little as about 2 grams or as much as about 10 grams of the sodium hydroxide in treating the 25 c. c. sample of the dip to which 40 c. c. of water has been added making the concentration at the beginning of the boiling or heating operation as low as about 3% and as high as about 15% of sodium hydroxide. However, the results tend to be objectionably low when concentrations of around 14% of sodium hydroxide are used at the beginning of the boiling and they are likewise too low when concentrations of sodium hydroxide around 4% are used. Chemically equivalent amounts and concentrations of other alkali metal hydroxides may also be used. The process of the boiling or heating of the mixture of the dip and sodium hydroxide ordinarily should not be carried out at temperatures very far outside of the range specified in the example, although it has been found that fairly satisfactory results are obtained at higher temperatures. On the other hand lower temperatures tend to give objectionably low results, although, of course, a correction factor may be applied if lower temperatures are used as will be readily understood by those skilled in the art. The time of boiling or heating the mixture of the sample of the bath and the sodium hydroxide may be varied over a considerable range. Thus, with fresh baths the time of actual boiling may be varied from one minute to 20 minutes with no objectionable variation in the results. However, it has been found that some of the dirtiest samples of used baths give low results when boiled for only 2 minutes and give a maximum titration when boiled for 6 minutes. For this reason the preferred time of boiling or heating is 6 minutes. It will be understood, of course, that when the test is made at relatively high altitudes it may be found necessary to lengthen the time of boiling to more than 6 minutes due to the lower temperature of boiling.

While the temperature of titration may be varied somewhat it has been found that to obtain best results, that is to say results which are reproducible with a minimum deviation from the average or mean value, the temperature of titration should be preferably between 70° F. and 80° F. At about 90° F. for the titration the results are about 5% higher than the results obtained within the preferred range specified. At temperatures below about 60° F. there is a slight decrease in the amount of iodine required for the complete titration but at temperatures around 60° F. this decrease is relatively small. At temperatures of titration around 180° F. to 190° F. it has been found that the amount of iodine required for the titration of a known amount of sulphur is somewhat over three times that required at the preferred temperature stated above. Even when the 25 c. c. sample of the solution to be titrated is diluted to a total of 450 c. c. before the titration using 2 grams of sodium hydroxide thus making the concentration of the sodium hydroxide about 0.44%, and when the titration is carried out at this higher range of temperature, the iodine consumed is still about 2½ times greater than that required at the preferred temperature. If the temperature of titration is lowered below 180° F. the amount of iodine required decreases sharply until about 110° F. is reached where it corresponds closely to that indicated by the above equation. Below 110° F. less iodine is required for the titration than that indicated by the above equation.

The total dilution or volume of the reaction mixture after the boiling or heating step and before the addition of the standard iodine solution thereto may be varied somewhat without objectionable variation of the amount of standard iodine solution required but we have found that if the solution is not diluted at all after boiling, the concentrated sodium hydroxide remaining tends to re-dissolve the finely divided sulphur at the instant of its precipitation by the iodine solution. This results in high and erratic results. On the other hand, too great dilution before titration requires an unwieldy flask and also dilutes the sulphide sulphur toward the end point of the titration so that the indicator does not produce a sufficiently intense color. We, therefore, prefer to employ a total volume of reaction mixture prior to titration of about 165 c. c. to about 170 c. c.

The concentration of the standard iodine solution containing potassium iodide or other equivalent alkali iodide may be varied considerably but owing principally to the basic character of the alkali iodide, the concentration of this solution should not be more than about 197½ grams of iodine and not less than about 53 grams of iodine per liter and not more than about 395 grams and not less than about 106 grams of alkali iodide per liter. It is not desirable to employ too large a volume of the iodine solution for the titration by reason of the limited capacity of the standard field kit referred to above, but it has been found reasonably convenient to employ an iodine solution containing 53 grams per liter and a suitable amount of alkali iodide so as to have 3.3 c. c. of the solution equivalent to 0.1% of sulphur instead of 2 c. c. being equivalent to the same quantity of sulphur as set forth in the above example.

As stated above in connection with the description of the specific example, the multiplication factor of 0.05 by which the number of cubic centimeters of the standard iodine solution consumed in the titration is multiplied in order to obtain the percent by weight of elementary sulphur in the sample corresponds to a ratio of iodine to sulphur by weight which is approximately 20% lower than the ratio indicated in the equation $Na_2S + I_2 = 2NaI + S$. In other words, the ratio of the weight of iodine consumed to the weight of sulphur present in the sample is approximately 80% of the ratio of the weights of iodine and sulphur as indicated by the said equation. In the case of the above mentioned permissible variations of the specific example it has been pointed out also that the results obtained, or, in other words, the ratio of the weight of iodine consumed in the titration to the weight of the sulphur present in the example differs somewhat from the results obtained in the specific example. Therefore, in connection with these permissible variations of the example, in calculating the weight of sulphur from the weight of iodine consumed, a ratio of iodine to sulphur by weight must be used which differs somewhat from the ratio employed in calculating the results of the specific example, this latter ratio, as stated above, being about 80% of the theoretical ratio as indicated by the above equation. Therefore, the ratio of iodine to sulphur by weight employed in calculating the weight of sulphur present in the sample in connection with these variations would be either more or less than 80% of this theoretical ratio. For convenience we have designated these different percentages of the theoretical ratio as correction factors to be employed in calculating the true weight of sulphur in the sample when different procedures (particularly different temperatures of titration) are employed in accordance with the above stated permissible variations of the method of our invention. Such correction factors may readily be worked out in tabular form if desired and added to the equipment of the field kit for the convenience of the worker in the field. Or, if desired, these correction factors may be expressed in terms of the corresponding multiplication factors as indicated in the specific example, all of which will be readily understood by those skilled in the art.

In working out such correction factors or the corresponding multiplication factors it is only necessary to apply the analytical method of the present invention to synthetic mixtures containing known amounts of elementary sulphur or to non-synthetic mixtures in which the amount of elementary sulphur has previously been determined by the more complicated prior analytical methods referred to above, with separate determination of the sulphates and the oxidizable compounds of sulphur present.

Furthermore, it will be understood by those skilled in the art that the specific example given above is preferred over the permissible variations set forth herein, mainly for the reason that the results of the method of the example are in the main more accurately reproducible and subject to less variation particularly in the hands of the worker in the field, than are the results obtained with the indicated variations referred to above. For these reasons, among others, the present invention is not limited to the details set forth in the specific example but includes all variations and equivalents thereof which are comprised within the scope of the appended claims.

We claim:

1. The method of determining the amount of suspended elementary sulphur in an aqueous medium containing the same which comprises chemically reacting a representative sample of the said medium containing the suspended sulphur with the hydroxide of an alkali metal to convert the elementary sulphur substantially completely to the monosulphide of the alkali metal and subsequently titrating the solution of the monosulphide thus obtained by the addition of standardized iodine solution thereto to convert the monosulphide to alkali iodide and elementary sulphur, using a soluble metal salt of nitroprussic acid as the indicator of the end point of the titration, the temperature of the monosulphide solution during said titration being maintained between about 60° F. and about 90° F., whereby the approximate weight of suspended sulphur in the said sample may be calculated from the weight of iodine consumed in said titration using for this calculation a ratio of iodine to sulphur by weight which is about 80% of that indicated by the following equation: $Na_2S + I_2 = 2NaI + S$.

2. The method of determining the amount of suspended elementary sulphur in an aqueous medium containing the same which comprises chemically reacting a representative sample of the said medium containing the suspended sulphur with a solution of the hydroxide of an alkali metal under the action of heat at elevated temperature to convert the elementary sulphur substantially completely to the monosulphide of the alkali metal, diluting the reaction mixture with water, cooling the diluted mixture and subsequently titrating the solution of the monosulphide thus obtained by the addition thereto of standardized iodine solution to convert the monosulphide to alkali iodide and elementary sulphur, using a soluble metal salt of nitroprussic acid as the indicator of the end point of the titration, the temperature of the monosulphide solution during said titration being maintained between about 60° F. and about 90° F., whereby the approximate weight of suspended sulphur in the said sample may be calculated from the weight of iodine consumed in said titration using for this calculation a ratio of iodine to sulphur by weight which is about 80% of that indicated by the following equation: $Na_2S + I_2 = 2NaI + S$.

3. The method of estimating the amount of elementary sulphur in mixtures containing the same which comprises chemically reacting the sulphur in said mixture with the hydroxide of an alkali metal to form a soluble sulphide of the alkali metal, bringing the said sulphide into intimate contact with a sufficient amount of iodine dissolved in a solution of an alkali metal salt of hydriodic acid to react chemically with all but a very slight excess of the said sulphide, and estimating the amount of elementary sulphur from the amount of iodine entering into the said chemical reaction between the iodine and the said sulphide.

4. The method of claim 3 wherein the slight excess of the sulphide of the alkali metal is not substantially greater than that amount which will react with a few drops of a dilute solution of an alkali metal salt of nitroprussic acid to form a purplish colored reaction product visible to the naked eye and wherein the said chemical interaction between the iodine and the sulphide of the alkali metal is carried out at a temperature between about 60° F. and about 80° F.

5. The method of determining the amount of suspended elementary sulphur in an aqueous medium containing the same which comprises chemically reacting a representative sample of the said medium containing the suspended sulphur with a solution of the hydroxide of an alkali metal under the action of heat at elevated temperature to convert the elementary sulphur substantially completely to the monosulphide of the alkali metal, diluting the reaction mixture with water, cooling the diluted mixture and subsequently titrating the solution of the monosulphide thus obtained by the addition thereto of standardized iodine solution to convert the monosulphide to alkali iodide and elementary sulphur, using a soluble metal salt of nitroprussic acid as the indicator of the end point of the titration, the temperature of the monosulphide solution during said titration being maintained between about 70° F. and about 80° F., whereby the approximate weight of suspended sulphur in the said sample may be calculated from the weight of iodine consumed in said titration using for this calculation a ratio of iodine to sulphur by weight which is about 80% of that indicated by the following equation:

$$Na_2S + I_2 = 2NaI + S.$$

6. The method of claim 5 wherein the ratio of the hydroxide of the alkali metal to the suspended elementary sulphur is not less than about 2 parts and not more than about 56 parts by weight of the hydroxide of the alkali metal to one part by weight of the elementary sulphur and wherein the concentration of the alkali metal hydroxide during the chemical reaction between the sulphur and the alkali metal hydroxide is between about 1.7% and about 17% by weight and wherein the said chemical reaction between the hydroxide of the alkali metal and the suspended sulphur is carried out at a temperature between about 194° F. and 217.4° F. and for a period of time not less than about 2 minutes.

7. The method of determining the amount of suspended elementary sulphur in an aqueous medium containing the same which comprises chemically reacting a representative sample of the said medium containing the suspended sulphur with the hydroxide of an alkali metal to convert the elementary sulphur substantially completely to the monosulphide of the alkali metal and subsequently titrating the solution of the monosulphide thus obtained by the addition of standardized iodine solution thereto to convert the monosulphide to alkali iodide and elementary sulphur, using a soluble metal salt of nitroprussic acid as the indicator of the end point of the titration, the temperature of the monosulphide solution during said titration being maintained between about 70° F. and about 80° F., whereby the approximate weight of suspended sulphur in the said sample may be calculated from the weight of iodine consumed in said titration using for this calculation a ratio of iodine to sulphur by weight which is about 80% of that indicating by the following equation: $Na_2S + I_2 = 2NaI + S.$ 8. The method of determining the amount of suspended elementary sulphur in an aqueous medium containing the same which comprises chemically reacting a representative sample of the said medium containing the suspended sulphur with a solution of the hydroxide of an alkali metal under the action of heat at elevated temperature to convert the elementary sulphur substantially completely to the monosulphide of the alkali metal, diluting the reaction mixture with water, cooling the diluted mixture and subsequently titrating 165 c. c. to 170 c. c. of the diluted solution of the monosulphide thus obtained by the addition thereto of standardized iodine solution to convert the monosulphide to alkali iodide and elementary sulphur, the standardized iodine solution containing alkali iodide and the concentration of said standardized solution corresponding to not more than about 197.5 grams of iodine and not less than about 53 grams of iodine per liter and not more than about 395 grams and not less than about 106 grams of alkali iodide per liter, using a soluble metal salt of nitroprussic acid as the indicator of the end point of the titration, the temperature of the monosulphide solution during said titration being maintained between about 70° F. and about 80° F., whereby the approximate weight of suspended sulphur in the said sample may be calculated from the weight of iodine consumed in said titration using for this calculation a ratio of iodine to sulphur by weight which is about 80% of that indicated by the following equation:

$$Na_2S + I_2 = 2NaI + S.$$

9. The method of determining the amount of elementary sulphur in mixtures containing the same which comprises chemically reacting a representative sample of the said mixture with a solution of the hydroxide of an alkali metal to convert the elementary sulphur to a soluble alkali sulphide and subsequently titrating the solution of the alkali sulphide thus obtained by addition thereto of a standardized iodine solution to convert the sulphide to an alkali iodide and elementary sulphur, using a soluble metal salt of nitroprussic acid as the indicator of the end point of the said titration, the temperature of the sulphide during the said titration being maintained at about 110° F., whereby the weight of elementary sulphur in the said sample may be calculated from the weight of iodine consumed in the said titration, using for this calculation the ratio of iodine to sulphur by weight corresponding to that indicated in the following equation:

$$Na_2S + I_2 = 2NaI + S.$$

10. The method of determining the amount of suspended elementary sulphur in an aqueous medium containing the same which comprises chemically reacting a representative sample of the said medium containing the suspended sulphur with the hydroxide of an alkali metal to convert the elementary sulphur substantially completely to the monosulphide of the alkali metal and subsequently titrating the solution of the monosulphide thus obtained by the addition of standardized iodine solution thereto to convert the monosulphide to alkali iodide and elementary sulphur, using a soluble metal salt of nitroprussic acid as the indicator of the end point of the titration, the temperature of the monosulphide solution during said titration being maintained at about 110° F., whereby the weight of elementary sulphur in the said sample may be calculated from the weight of iodine consumed in the said titration, using for this calculation the ratio of iodine to sulphur by weight corresponding to that indicated in the following equation: $Na_2S + I_2 = 2NaI + S$.

ROBERT G. MEWBORNE.
JOHN F. LES VEAUX.